US006541115B2

United States Patent
Pender et al.

(10) Patent No.: US 6,541,115 B2
(45) Date of Patent: Apr. 1, 2003

(54) METAL-INFILTRATED POLYCRYSTALLINE DIAMOND COMPOSITE TOOL FORMED FROM COATED DIAMOND PARTICLES

(75) Inventors: David Charles Pender, Schenectady, NY (US); Charles Dominic Iacovangelo, Niskayuna, NY (US); Mark Philip D'Evelyn, Niskayuna, NY (US); Steven Alfred Tysoe, Ballston Spa, NY (US)

(73) Assignee: General Electric Company, Niskayuna, NY (US)

( * ) Notice: Subject to any disclaimer, the term of this patent is extended or adjusted under 35 U.S.C. 154(b) by 12 days.

(21) Appl. No.: 09/793,312

(22) Filed: Feb. 26, 2001

(65) Prior Publication Data

US 2002/0119303 A1 Aug. 29, 2002

(51) Int. Cl.$^7$ .................................................. B32B 9/00
(52) U.S. Cl. .......................... 428/408; 51/307; 51/309; 407/119; 428/323; 428/457; 428/469; 428/472; 428/698
(58) Field of Search ................. 407/119; 51/307, 51/309; 428/457, 408, 323, 469, 472, 698

(56) References Cited

U.S. PATENT DOCUMENTS

| | | | |
|---|---|---|---|
| 4,518,659 A | | 5/1985 | Gigl et al. |
| 4,539,018 A | * | 9/1985 | Whanger et al. |
| 4,738,689 A | * | 4/1988 | Gigl et al. |
| 4,907,377 A | | 3/1990 | Csillag et al. |
| 4,943,488 A | * | 7/1990 | Sung et al. |
| 5,211,726 A | * | 5/1993 | Slutz et al. |
| 5,759,216 A | | 6/1998 | Kanada et al. |
| 5,783,316 A | * | 7/1998 | Colella et al. |
| 6,106,957 A | * | 8/2000 | Fang |

* cited by examiner

Primary Examiner—Archene Turner
(74) Attorney, Agent, or Firm—Robert P. Santandrea; Noreen C. Johnson (57) ABSTRACT

A metal-infiltrated polycrystalline diamond composite tool comprising a plurality of diamond grains forming a continuous polycrystalline diamond matrix, a metallic phase being substantially palladium-free and contiguous to the continuous polycrystalline diamond matrix, wherein the metallic phase interpenetrates the continuous polycrystalline diamond matrix and substantially wets an outer surface of the continuous polycrystalline diamond matrix; and a working surface. The metallic phase is formed from an infiltrant and a wetting-enhancement layer disposed on the outer surfaces of the diamond particles, with both the infiltrant and wetting-enhancement layer being substantially palladium-free and comprising at least one metal from the group consisting of cobalt, iron, and nickel. The invention also includes a preform for a metal-infiltrated polycrystalline diamond composite tool, the perform comprising a container, a metallic infiltrant source, and a plurality of coated diamonds, each coated with a wetting-enhancement layer and, optionally, an activation layer, both of which are substantially palladium-free. Methods of forming the metal-infiltrated polycrystalline diamond composite tool, the preform, and the coated diamond particles used in the tool are also disclosed.

22 Claims, 8 Drawing Sheets

METAL-INFILTRATED POLYCRYSTALLINE DIAMOND COMPOSITE TOOL FORMED FROM COATED DIAMOND PARTICLES

BACKGROUND OF THE INVENTION

The invention relates to a metal-infiltrated polycrystalline diamond composite tool. More particularly, the invention relates to diamond particles that are used to form such a tool. Even more particularly, the invention relates to diamond particles having an activated surface layer. Finally, the invention relates to a method of forming a metal-infiltrated polycrystalline diamond composite tool from diamond particles having such an activated surface layer.

Polycrystalline diamond tools are often manufactured from dense blanks that are formed by infiltrating a matrix of diamond particles with a molten metal, such as cobalt. The molten metal acts as a liquid-state sintering aid, partially dissolving the diamonds and producing diamond-to-diamond bonding within the composite. One problem encountered with infiltrating the bed of diamond particles is that the metal does not wet the surface of the diamonds well. As a result, the matrix is not completely infiltrated and the diamond-to-diamond bonds are not formed in some locations, thus preventing the optimization of the overall strength and abrasion resistance of the cutting tool.

To improve wetting of the diamonds by the molten metal, the diamonds in such tools may be initially coated with the same—or similar—metal that is used as an infiltrant metal to facilitate infiltration and formation of the diamond-to-diamond bonds. An electroless plating technique, in which the diamonds are exposed to a solution containing the coating material, has been used to coat diamond particles with a metal. Electroless plating of a substrate, however, requires a catalytic reduction of metal ions in the presence of a reducing agent. For non-conducting materials such as diamond, the substrate surface must therefore be activated prior to plating. In contrast, many metal substrates do not require such activation, as the surface is already catalytic.

Palladium (Pd) is frequently used to activate substrate materials prior to coating. The most common procedure is to first sensitize the substrate surface with tin dichloride ($SnCl_2$), followed by activation using a solution of Pd and hydrochloric acid (HCl). Alternatively, a colloidal Pd solution, which also frequently contains Sn, can be used to activate the substrate surface. One of these two methods is commonly used in the electroless plating of diamond. Kanada et al. (U.S. Pat. No. 5,759,216), for example, have used an activation solution comprised substantially of palladium to obtain metal-coated diamonds, which were subsequently used to form polycrystalline diamond (PCD) under high pressure and high temperature conditions.

One drawback to the use of palladium as an activating metal is its expense. It is therefore desirable to identify a less expensive alternative procedure for producing metallic coatings that are applied to the diamond particles. Therefore, what is needed is a diamond particle having a palladium-free coating that enhances wetting by the molten metal infiltrant. What is also needed is a diamond particle coated with an activation layer formed from a relatively inexpensive metal, the activation layer being capable of catalytically reducing metallic coatings that are applied to the diamond particles by electroless deposition. What is further needed is a method of applying such an activation layer to the diamond particles. In addition, what is needed is a metal-infiltrated polycrystalline diamond composite tool that comprises a number of diamond particles having such an activation layer. Finally, what is needed is a method of forming such a tool.

BRIEF SUMMARY OF THE INVENTION

The present invention satisfies these needs and others by providing a metal-infiltrated polycrystalline diamond composite tool having a plurality of diamond grains forming a continuous polycrystalline diamond matrix, the polycrystalline diamond matrix being interpenetrated by a substantially palladium-free metallic phase. The present invention also provides a preform for such metal-infiltrated polycrystalline diamond composite tools, in which diamond particles having a substantially palladium-free wetting enhancement layer contact a metallic infiltrant source. The present invention also provides methods of making a metal-infiltrated polycrystalline diamond composite tool, a preform, and a coated diamond particle for such a tool, all of which are substantially palladium-free.

Accordingly, one aspect of the present invention is to provide a metal-infiltrated polycrystalline diamond composite tool. The metal-infiltrated polycrystalline diamond composite tool comprises: a plurality of diamond grains, the plurality of diamond grains forming a continuous polycrystalline diamond matrix; a substantially palladium-free metallic phase, the metallic phase being substantially palladium-free and contiguous to the continuous polycrystalline diamond matrix, wherein the metallic phase interpenetrates the continuous polycrystalline diamond matrix and substantially wets an outer surface of the continuous polycrystalline diamond matrix; and a working surface.

A second aspect of the invention is to provide a preform for a metal-infiltrated polycrystalline diamond composite tool. The preform comprises: a container formed from a refractory material; a plurality of coated diamond particles disposed in the container and forming a bed therein, each of the plurality of coated diamond particles comprising a diamond having an outer surface and a wetting-enhancement coating disposed thereon, the wetting-enhancement coating being substantially palladium-free and comprising at least one metal selected from the group consisting of cobalt, iron, and nickel, wherein the wetting-enhancement coating substantially covers the outer surface; and a metallic infiltrant source disposed in the container and contacting the bed of the plurality of: coated diamond particles. The metallic infiltrant source comprises at least one metal selected from the group consisting of cobalt, iron, and nickel.

A third aspect of the invention is to provide a metal-infiltrated polycrystalline diamond composite tool formed from a preform. The preform comprises: a container formed from a refractory material; a plurality of coated diamond particles disposed in the container and forming a bed therein, each of the plurality of coated diamond particles comprising a diamond having an outer surface and a wetting-enhancement coating disposed thereon, the wetting-enhancement coating being substantially palladium-free and comprising a metal selected from the group consisting of cobalt, iron, and nickel, wherein the wetting-enhancement coating substantially covers the outer surface; and a metallic infiltrant source contacting the bed of the plurality of coated diamond particles. The metal-infiltrated polycrystalline diamond composite tool comprises: a plurality of diamond grains, the plurality of diamond grains forming a continuous polycrystalline diamond matrix; a metallic phase, the metallic phase being substantially palladium-free and contiguous to the continuous polycrystalline diamond matrix, wherein the metallic phase interpenetrates the continuous polycrystalline diamond: matrix and substantially wets an outer surface of the continuous polycrystalline diamond matrix, and wherein the metallic phase comprises at least one metal selected from the group consisting of cobalt, iron, and nickel; and an abrasive working surface;.

A fourth aspect of the invention is to provide a method of making a metal-infiltrated polycrystalline diamond composite tool. The method comprises the steps of: providing a preform, the preform comprising: a container containing a metallic infiltrant, the metallic infiltrant being substantially palladium-free, and a plurality of coated diamond particles, wherein each of the coated diamond particles comprises a diamond having an outer surface and a substantially palladium-free wetting-enhancement coating disposed thereon; infiltrating the plurality of coated diamond particles with the metallic infiltrant and producing diamond-to-diamond bonding, thereby forming a metal-infiltrated polycrystalline diamond composite blank; and forming a working surface on at least one surface of the metal-infiltrated polycrystalline diamond composite blank, thereby forming the metal-infiltrated polycrystalline diamond composite tool.

A fifth aspect of the invention is to provide a method of making a coated diamond particle for use in a metal-infiltrated polycrystalline diamond composite tool. The method comprises the steps of: providing a diamond; and coating an outer surface of the diamond with a substantially palladium-free wetting-enhancement coating comprising a metal selected form the group consisting of cobalt, iron, and nickel, such that the substantially palladium-free wetting-enhancement coating substantially covers the outer surface, thereby forming a coated diamond particle.

Finally, a sixth aspect of the invention is to provide a method of making a preform for a metal-infiltrated polycrystalline diamond composite tool. The method comprising the steps of: providing a container formed from a refractory material; providing a plurality of coated diamond particles to the container, each of the coated diamond particles comprising a diamond having an outer surface and a substantially palladium-free wetting-enhancement coating disposed thereon; and providing a substantially palladium-free metallic infiltrant source to the container such that the substantially palladium-free metallic infiltrant source contacts the plurality of coated diamond particles.

These and other aspects, advantages, and salient features of the invention will become apparent from the following detailed description, the accompanying drawings, and the appended claims.

DETAILED DESCRIPTION OF THE PREFERRED EMBODIMENT

In the following description, like reference characters designate like or corresponding parts throughout the several views shown in the figures. It is also understood that terms such as "top," "bottom," "outward," "inward," and the like are words of convenience and are not to be construed as limiting terms.

Figure 1:
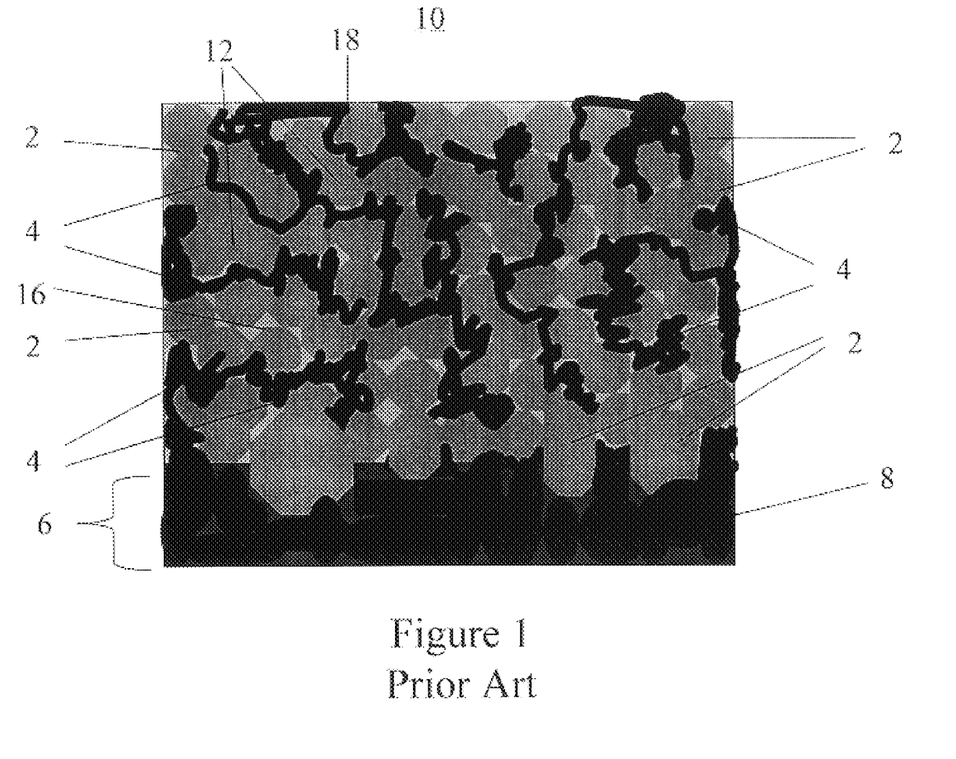
FIG. 1 is a schematic view of an infiltrated polycrystalline diamond composite tool of the prior-art.

Referring to the drawings in general and FIG. 1 in particular, it will be understood that the illustrations are for the purpose of describing the preferred embodiment of the invention and are not intended to limit the invention thereto.

An infiltrated polycrystalline diamond composite tool 10 of the prior art is shown in FIG. 1. The infiltrated polycrystalline diamond composite tool 10 includes a plurality of uncoated diamonds 2 with an infiltrant 4 disposed between the diamonds 2. Free space 16 may exist between the uncoated diamond particles 2. The infiltrated polycrystalline diamond composite tool 10 has a working surface 18. Depending on the intended application of the infiltrated polycrystalline diamond composite tool 10, the working surface may be a cutting edge, an abrasive surface, or the like. The infiltrated polycrystalline diamond composite tool 10 may also include a support 6, which generally comprises the infiltrant material. The support 6 may also include a hard material 8, such as a carbide. The support 6 serves as a backing layer and ultimately provides a degree of support and rigidity to the infiltrated polycrystalline diamond composite tool 10.

In the prior-art infiltrated polycrystalline diamond composite tool 10, the infiltrant 4 has partially in,filtrated most of the free space 16 between the diamonds 2. During the formation of the infiltrated polycrystalline diamond composite tool 10, the diamonds 2 are partially dissolved by the infiltrant 8 and subsequently precipitated, resulting in diamond-to-diamond bonding 12 and grain growth, which in turn forms a continuous polycrystalline diamond matrix 13. Because the matrix material 4 does not wet the surface of the diamonds 2 well, infiltration of the pre-form is incomplete. As a result, diamond-to-diamond bonding 12 within the infiltrated polycrystalline diamond composite tool 10 is incomplete and the polycrystalline diamond matrix 13 does not completely form. In addition, some free space 16 remains within the infiltrated polycrystalline diamond composite tool 10. Consequently, the durability of the infiltrated polycrystalline diamond composite tool 10 is limited.

Figure 2:
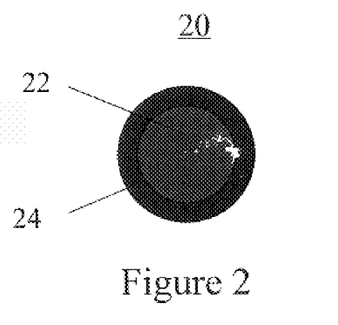
FIG. 2 is a schematic view of a diamond having a wetting-enhancement coating of the present invention.

FIG. 2 is a schematic representation of a coated diamond particle 20 of the present invention. The coated diamond particle 20 comprises a diamond 22 having a palladium-free wetting-enhancement coating 24 disposed on and substantially covering the outer surface of the diamond 22. The wetting enhancement coating 24 may comprise the same material as that is later used as the infiltrant in the tool. The wetting enhancement coating 24 is preferably formed from either nickel, cobalt, iron, or combinations thereof, with cobalt being the most preferred material. The palladium-free wetting-enhancement coating 24 can be deposited directly onto the surface of the diamond 22 using vapor deposition techniques such as, but not limited to, chemical vapor deposition, physical vapor deposition, plasma assisted chemical vapor deposition, and combinations thereof.

Figure 3:
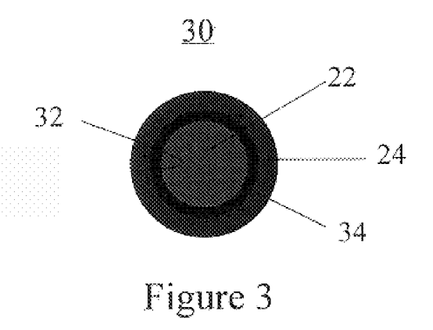
FIG. 3 is a schematic view of a diamond having a wetting-enhancement coating, activation coating, and sensitized surface.

A schematic view of another coated diamond particle 30 of the present invention is shown in FIG. 3. The diamond 22 is coated with a palladium-free activation layer 34 and a palladium-free wetting-enhancement coating 24 to form the coated diamond particle 30. The surface of the diamond 22 is a sensitized surface 32, formed by treating the diamond 22 with a sensitizing agent. The sensitizing agent typically has two stable valence states, is capable of reacting with the activation layer 34, and is stable in water. In the present invention, the surface of the diamond 22 is preferably sensitized by immersing the diamond 22 in a solution of tin dichloride ($SnCl_2$) and hydrochloric acid (HCl) at room temperature for approximately five minutes. Other metals having two stable valence states, including manganese, iron, cobalt, nickel, copper, and cadmium, may be used as sensitizing agents as well. During sensitization, $SnCl_2$ is physically absorbed onto the surface of the diamond 22. Following immersion, the diamond is then washed with distilled water and dried.

Following sensitization, the palladium-free activation layer 24 is deposited onto the sensitized surface 32 of the diamond 22. The palladium-free activation layer 34 is preferably formed from silver, although other metals, such as copper, gold, cobalt, and platinum, may be used to form the palladium-free activation layer 34. When silver is used to form the palladium-free activation layer 34, the sensitized diamond 22 is immersed in a silver nitrate ($AgNO_3$) solution at room temperature for approximately five minutes. Tin dichloride ($SnCl_2$), which is the preferred sensitizer of the present invention, forms the species Sn(IV) on the sensitized surface 32 of the diamond 22, thereby preventing the oxidation of the metal activator species in the palladium-free activation layer 34. The palladium-free activation layer 34 comprising silver is precipitated onto the diamond surface according to the reaction.

$$Sn^{2+} + 2Ag^+ \rightarrow Sn^{4+} + 2Ag^o$$

to form elemental silver on the sensitized surface 32 of the diamond 22. The palladium-free activation layer 34 comprising silver may be alternatively deposited from a colloidal suspension of silver. Following precipitation of the palladium-free activation layer 34, the diamond 22 is again washed with distilled water and dried. The palladium-free activation layer 34 formed from silver may comprise between about 0.01 and about 10 weight percent of the diamond particle.

Following deposition of the palladium-free activation layer 34 on the diamond 22, the palladium-free wetting-enhancement coating 24 is deposited over the palladium-free activation layer 34. The palladium-free wetting-enhancement coating 24 is preferably deposited by an electroless plating process. As described above, the palladium-free wetting-enhancement coating 24 may be comprised of the same material as the metallic infiltrant that will ultimately be used to form an infiltrated tool. The palladium-free wetting-enhancement coating 24 may be formed from either nickel, cobalt, iron, or combinations thereof, with cobalt being the preferred material. The electroless plating procedure is a simple reduction reaction, in which the cobalt (II) ion from cobalt (II) sulfate is reduced to elemental cobalt while dimethylamineborane (DMAB) is oxidized to $(CH_3)_2NH_2^+$ and $B(OH)_3$:

$$3Co^{2+} + 3(CH_3)_2NHBH_3 + 6H_2O \rightarrow 3Co^o + B + 3(CH_3)_2NH_2^+ + 2B(OH)_3 + 9/2H_2 + 3H^+$$

The reduction of cobalt continues in the presence of the reducing agent as long as the catalytic reduction of the metal is possible. In the present invention, the catalytic sites at which the electroless plating takes place are provided by first depositing the palladium-free activation layer 34. In the absence of such catalytic sites, little if any coverage of the diamond 22 by the palladium-free wetting-enhancement coating 24 could be achieved by electroless plating.

The palladium-free wetting-enhancement coating 24 may further include either phosphorus or boron. In the present invention, the palladium-free wetting-enhancement coating 24 preferably comprises cobalt and boron. Boron, which is produced by the reduction of Co(II) by DMAB, may comprise up to 30 weight percent of the palladium-free wetting-enhancement coating 24. To achieve the optimum abrasion resistance, a palladium-free wetting-enhancement coating 24 comprising up to about 5 weight percent boron is preferred. The palladium-free wetting-enhancement coating 24 preferably has a thickness of between about 0.01 microns and about 5 microns.

The coated diamond particles 20, 30 of the present invention have an average diameter in the range of between about 0.0001 and about 1 millimeter. For use in a cutting tool, the average diameter of the coated diamond particles 20, 30 is preferably greater than about 10 microns and less than about 100 microns, as coated diamond particles 20, 30 in this size range provide optimal abrasion resistance for the tool. In addition to use in a cutting tool application, the coated diamond particles 20, 30 of the present invention may be used for mesh products, such as grit for abrasives, which utilize diamond particles having an average diameter between about 10 microns and about 1 millimeter.

Figure 4:
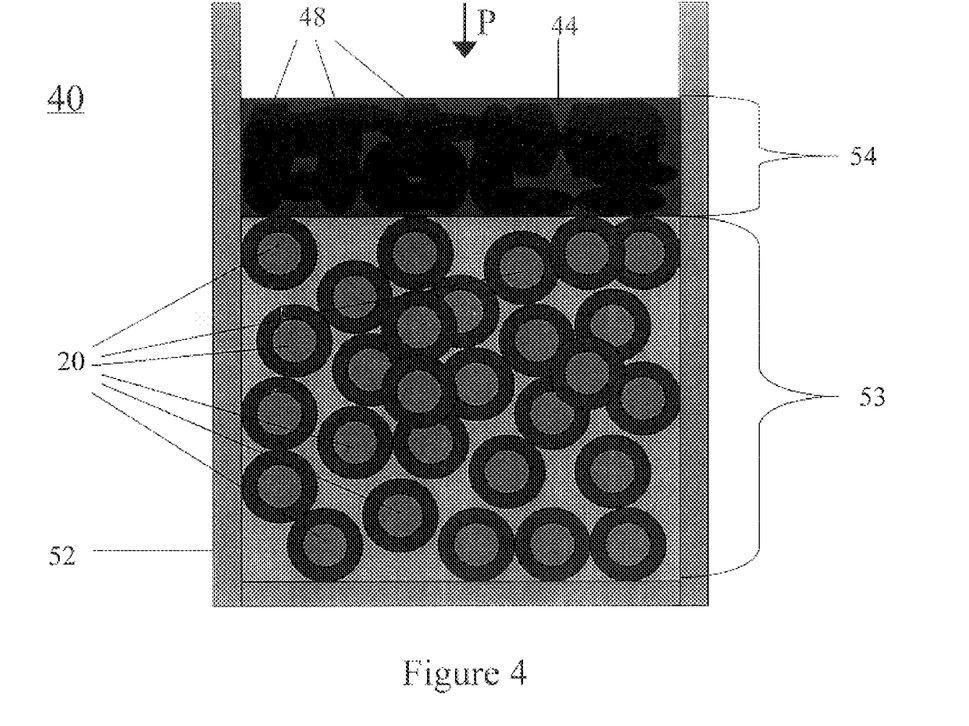
FIG. 4 is a schematic view of a preform for an infiltrated polycrystalline diamond composite tool of the present invention.

Infiltrated polycrystalline diamond composite tools of the present invention include cutting tool blanks, wire dies, drill blanks, and the like. These infiltrated polycrystalline diamond composite tools are formed from a preform that is prepared using the coated diamond particles 20, 30 described above and a metallic infiltrant source that infiltrates the: free space 16 between the coated diamond particles 20, 30 under the application of; high temperature and pressure. FIG. 4 is a schematic representation of a preform 40 of the present invention. A plurality of coated diamond particles 20 are placed in a refractory container 52 to form a bed 53. Coated diamond particles 30, having a sensitized surface 32, palladium-free activation layer 34, and palladium-free wetting-enhancement coating 24 can be substituted for part or all of the coated diamond particles 20. The refractory container 52 is formed from a refractory material, such as a ceramic or metal, having a melting temperature above that of the metallic infiltrant 44 and the temperatures used in the infiltration process. A metallic infiltrant source 54, comprising the metallic infiltrant 44, is placed in the refractory container 52, such that the metallic infiltrant source 54 contacts the bed 53 of coated diamond particles 20. Preferably, the metallic infiltrant source 54, is placed in the refractory container 52 such that the metallic infiltrant source 54 is positioned on top of and in contact with the bed 53 of coated diamond particles 20. The metallic infiltrant 44 is substantially palladium-free and preferably comprises cobalt, although iron, nickel, and combinations of iron, nickel, and cobalt may also be used. The pre-form 40 is then heated to a temperature above the melting point of the metallic infiltrant 44 and pressure is applied to the metallic infiltrant source 54, thereby forcing the molten metallic infiltrant 44 into the free space 16 between the coated diamond particles 20. The preform 40 is preferably heated to a temperature between about 1300° C. and about 1700° C.

Pressures in the range of between about 40 kbar to about 70 kbar are applied to the preform 40 in order to achieve infiltration by the metallic infiltrant 44.

Figure 5:
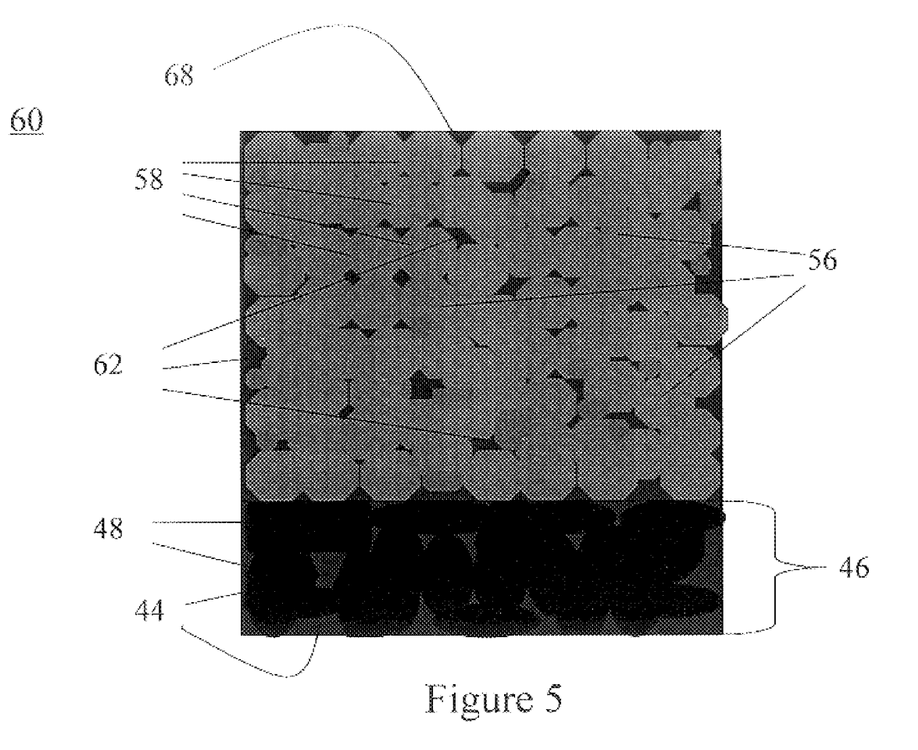
FIG. 5 is a schematic view of an infiltrated polycrystalline diamond composite tool of the present invention.

During the infiltration process, the palladium-free wetting-enhancement coating 24 melts and combines with the molten metallic infiltrant 44. The presence of the palladium-free wetting-enhancement coating 24 on the diamonds 22 permits the molten metallic infiltrant 44 to completely wet the diamonds 22. At the same time, the combination of molten metallic 44 and palladium-free wetting-enhancement coating 24 acts as a liquid-state sintering aid, dissolving some of the diamonds 22. The diamonds 22 then ;re-crystallize to form a continuous polycrystalline diamond matrix 56 in which diamond-to-diamond bonding 58 between individual diamonds 22 is present. Upon cooling, the combined molten metallic infiltrant 44 and palladium-free wetting-enhancement coating 24 materials resolidify to form a contiguous, fully dense metallic phase 62!that interpenetrates the continuous polycrystalline diamond matrix 56, as shown in FIG. 5, to form a fully infiltrated polycrystalline diamond composite tool blank 59. A working surface 68, such as a cutting edge or an abrasive surface, can then be provided to form the infiltrated polycrystalline diamond composite tool 60. The continuous polycrystalline diamond matrix 56 formed from the diamonds 22 comprises between about 85 and about 95 volume percent of the infiltrated polycrystalline diamond composite tool 60.

The infiltrated polycrystalline diamond composite tool 60 is preferably a supported infiltrated polycrystalline diamond composite tool 60, having an infiltrated support layer 46, as shown in FIG. 5. The infiltrated support layer 46 comprises a continuous matrix formed by a plurality of hard particles 48 that is interpenetrated by the metallic infiltrant 44. The hard material 48 is preferably tungsten carbide, although other carbides, such as silicon carbide, titanium carbide, zirconium carbide, niobium carbide, combinations thereof, and the like may be used. The supported infiltrated polycrystalline diamond composite tool 60 is formed by including particles of the hard material 48 in the metallic infiltrant source 54 that is used to assemble the preform 40. During the infiltration process, the infiltrated support layer 46 fuses to the remainder of the infiltrated polycrystalline diamond composite tool 60.

The features of the present invention are illustrated by the following example.

EXAMPLE 1

Figure 6:
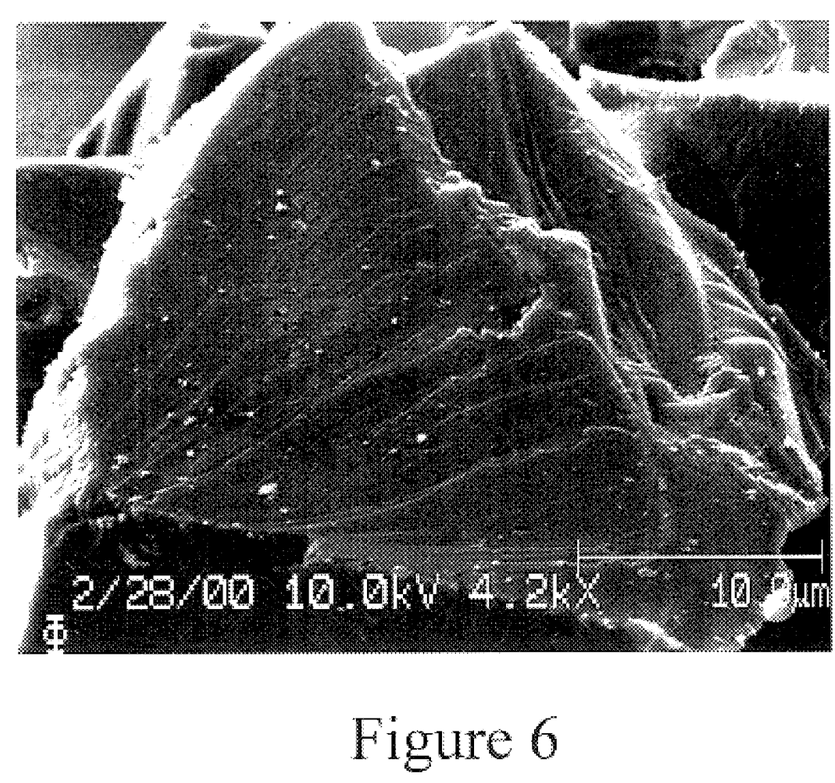
FIG. 6 is a SEM micrograph of a palladium-activated Co—B coated diamond particle.
Figure 7:
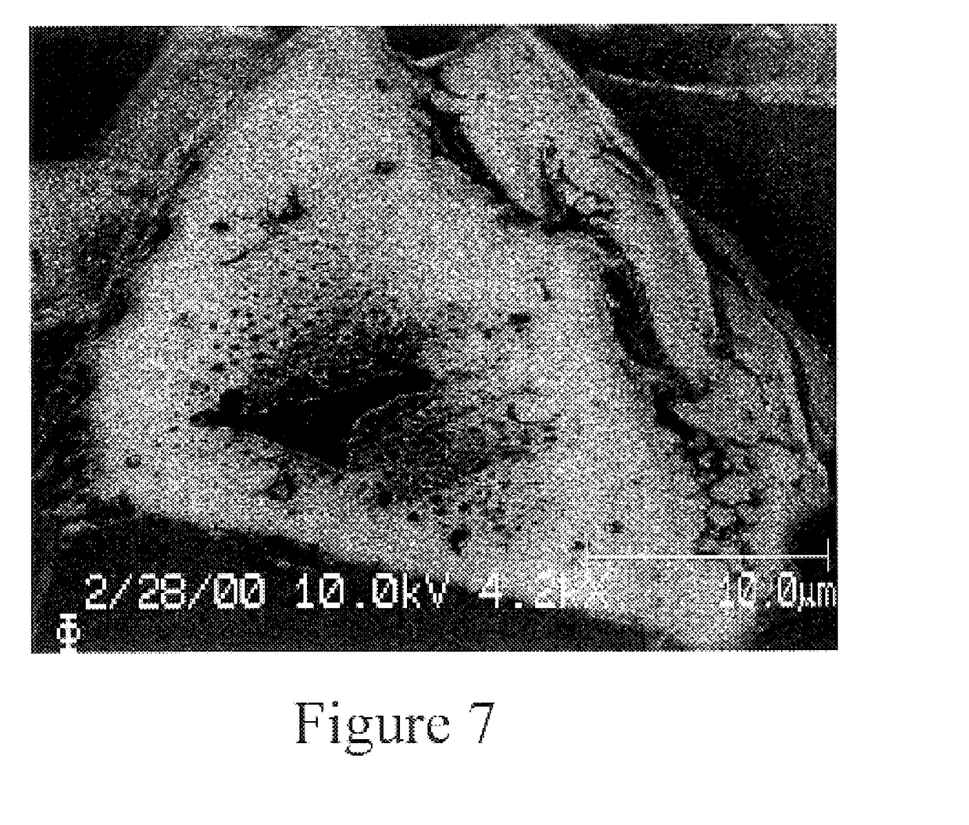
FIG. 7 is an Auger spectroscopy cobalt scan of a palladium-activated Co—B coated diamond particle.
Figure 8:
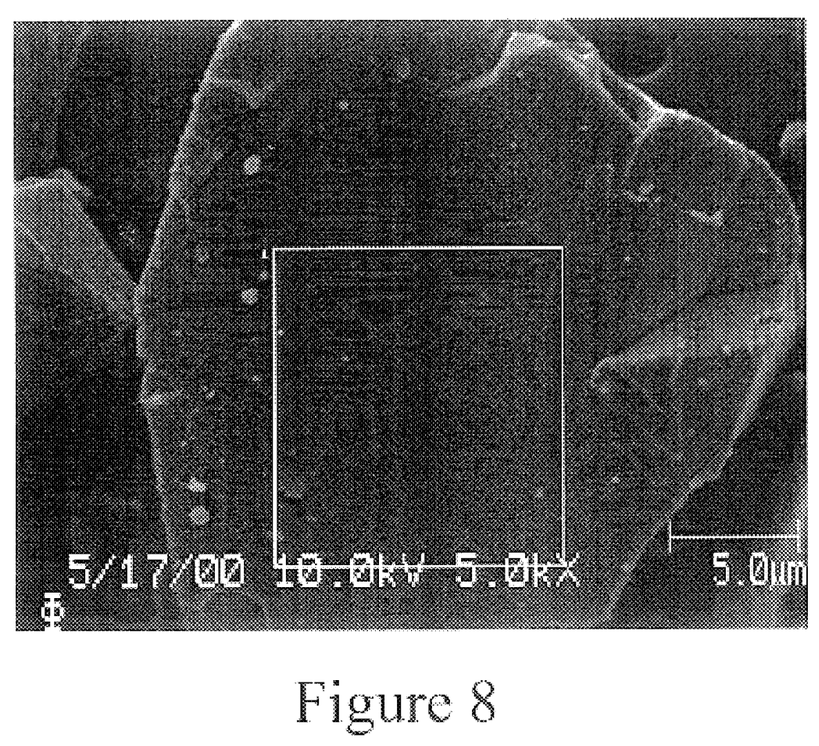
FIG. 8 is a SEM micrograph of a silver-activated Co—B coated diamond particle.
Figure 9:
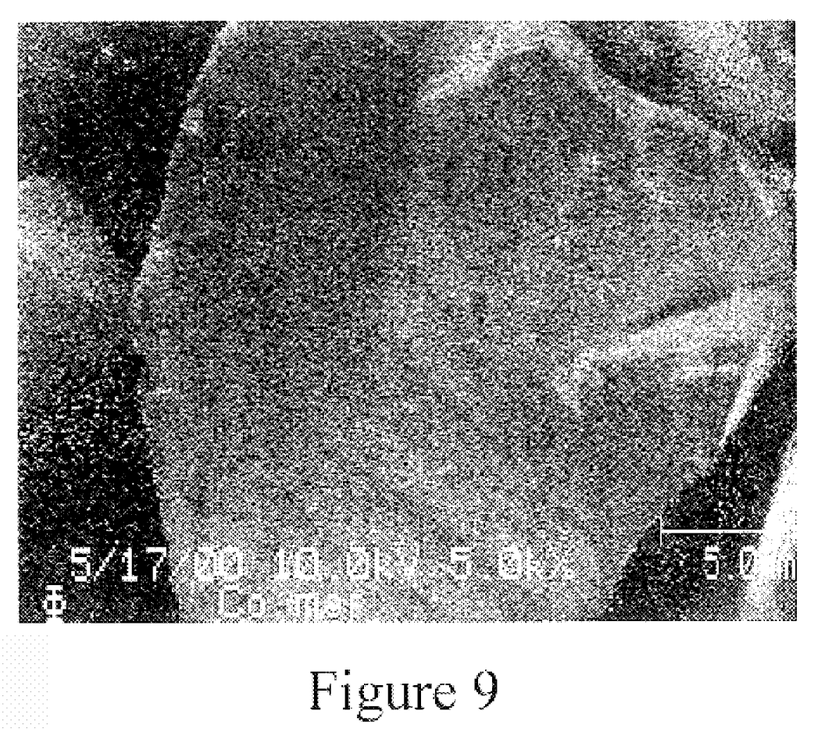
FIG. 9 is an Auger spectroscopy cobalt scan of a silver-activated Co—B coated diamond particle.

An activated layer of palladium was precipitated onto a first group of diamond particles. A second group of diamond particles was provided with a silver activation layer precipitated from solution. Both the first and second groups of diamond particles were then electrolessly plated with a cobalt/boron coating. Scanning electron microscopy (SEM) was used to study the integrity of the cobalt/boron coatings on the two groups of particles. Similarly, auger spectroscopy scans were used to investigate the continuity of the cobalt/boron coatings. A representative SEM micrograph and Auger spectroscopy scan obtained for the palladium-activated diamond particles are shown in FIGS. 5 and 6, respectively. FIGS. 7 and 8 are a SEM micrograph and Auger spectroscopy scan, respectively, obtained for silver-activated diamond particles. There was no discernible difference in the contiguity of the cobalt/boron coatings deposited on the silver-activated particles and the contiguity of the cobalt/boron coatings deposited on the,palladium-activated particles. The integrity of the coating appears to be the same, or perhaps superior for the silver activated material. The experiment also showed no distinct difference in the apparent continuity of the coatings.

Polycrystalline diamond composite tools were also produced using these coated diamond particles, with no adverse sintering affects noted. Abrasion tests were then conducted on these polycrystalline diamond composite tools. The tests indicated that the polycrystalline diamond composite tools of the present invention had abrasion resistances that were at least as good as those of tools made using uncoated diamond particles.

While various embodiments are described herein, it will be appreciated from the specification that various combinations of elements, variations or improvements therein may be made by those skilled in the art, and are within the scope of the invention.

What is claimed is:

1. A metal-infiltrated polycrystalline diamond composite tool, said metal-infiltrated: polycrystalline diamond tool comprising:

a) a plurality of diamond grains, wherein said plurality of diamond grains are bonded to each other to form a continuous polycrystalline diamond matrix;

b) a metallic phase, said metallic phase comprising at least one metal selected from the group consisting of silver, copper, gold, platinum, and combinations thereof and being substantially palladium-free and contiguous to said continuous polycrystalline diamond matrix, wherein said metallic phase interpenetrates the continuous polycrystalline diamond matrix and substantially wets an outer surface of said continuous polycrystalline diamond matrix; and c) a working surface.

2. The metal-infiltrated polycrystalline diamond composite tool of claim 1, wherein said working surface comprises an abrasive surface.

3. The metal-infiltrated polycrystalline diamond composite tool of claim 2, wherein said metal-infiltrated polycrystalline diamond composite tool is a tool selected from the group consisting of cutting tool blanks, wire dies, and drill blanks.

4. The metal-infiltrated polycrystalline diamond composite tool of claim 1, wherein said metallic phase comprises at least one metal selected from the group consisting of cobalt, iron, and nickel.

5. The metal-infiltrated polycrystalline diamond composite tool of claim 4, wherein said metallic phase comprises cobalt.

6. The metal-infiltrated polycrystalline diamond composite tool of claim 4, wherein said metallic phase further comprises at least one element selected from the group consisting of phosphorus, tin, and boron.

7. The metal-infiltrated polycrystalline diamond composite tool of claim 1, wherein each of said plurality of diamond grains has an average diameter between about 0.0001 mm and about 1 mm.

8. The metal-infiltrated polycrystalline diamond composite tool of claim 7, wherein each of said plurality of diamond grains has an average diameter between about 10 microns and about 100 microns.

9. The metal-infiltrated polycrystalline diamond composite tool of claim 1, further including a support layer disposed on a surface of said metal-infiltrated polycrystalline diamond composite tool opposite said working surface, said support layer comprising a continuous matrix formed by a plurality of hard particles and said metallic phase interpenetrating said continuous matrix.

10. The metal-infiltrated polycrystalline diamond composite tool of claim 9, wherein each of said plurality of hard particles comprises at least one metal carbide selected from the group consisting of niobium carbide, silicon carbide, titanium carbide, tungsten carbide, zirconium carbide, and combinations thereof.

11. The metal-infiltrated polycrystalline diamond composite tool of claim 10, wherein each of said plurality of hard particles comprises tungsten carbide.

12. The metal-infiltrated polycrystalline diamond composite tool of claim 1, wherein said continuous, polycrystalline diamond matrix comprises between about 85 and about 95 volume percent of said metal-infiltrated polycrystalline diamond composite tool.

13. A metal-infiltrated polycrystalline diamond composite tool formed from a preform, said preform comprising: a container formed from a refractory material; a plurality of coated diamond particles disposed in said container and forming a bed therein, each of said plurality of coated diamond particles comprising a diamond having an outer surface and a wetting-enhancement coating disposed thereon, said wetting-enhancement coating being substantially palladium-free and comprising a metal selected from the group consisting of cobalt, iron, and nickel, wherein said wetting-enhancement coating substantially covers said outer surface; and a metallic infiltrant source (54) contacting said bed of said plurality of coated diamond particles, said metal-infiltrated polycrystalline diamond composite tool comprising:

a) a plurality of diamond grains, wherein said plurality of diamond grains are bonded to each other to form a continuous polycrystalline diamond matrix;

b) a metallic phase, said metallic phase comprising at least one metal selected from the group consisting of silver, copper, gold, platinum, and combinations thereof and being substantially palladium-free and contiguous to continuous polycrystalline diamond matrix, wherein said metallic phase interpenetrates said continuous polycrystalline diamond matrix and substantially wets an outer surface of said continuous polycrystalline diamond matrix; and wherein said metallic phase comprises at least one metal selected from the group consisting of cobalt, iron, and nickel: and c) an abrasive working surface.

14. The metal-infiltrated polycrystalline diamond composite tool of claim 13, wherein said metallic phase comprises cobalt.

15. The metal-infiltrated polycrystalline diamond composite tool of claim 13, wherein said metallic phase further comprises at least one element selected from the group consisting of phosphorus, tin, and boron.

16. The metal-infiltrated polycrystalline diamond composite tool of claim 13, wherein each of said plurality of diamond grains has an average diameter between about 0.0001 mm and about 1 mm.

17. The metal-infiltrated polycrystalline diamond composite tool of claim 16, wherein each of said plurality of diamond grains has an average diameter between about 10 microns and about 100 microns.

18. The metal-infiltrated polycrystalline diamond composite tool of claim 13, further including a support layer disposed on a surface of said metal-infiltrated polycrystalline diamond composite tool opposite said abrasive working surface, said support layer comprising a continuous matrix formed by a plurality of hard particles and said metallic phase interpenetrating said continuous matrix.

19. The metal-infiltrated polycrystalline diamond composite tool of claim 17, wherein each of said, plurality of hard particles comprises at least one metal carbide selected from the group consisting of niobium carbide, silicon carbide, titanium carbide, tungsten carbide, zirconium carbide, and combinations thereof.

20. The metal-infiltrated polycrystalline diamond composite tool of claim 18, wherein each of said plurality of hard particles comprises tungsten carbide.

21. The metal-infiltrated polycrystalline diamond composite tool of claim 13, wherein said metal-infiltrated polycrystalline diamond composite tool is a tool selected from the group consisting of cutting tool blanks, wire dies, and drill blanks.

22. The metal-infiltrated polycrystalline diamond composite tool of claim 13, wherein said continuous polycrystalline diamond matrix comprises between about 85 and about 95 volume percent of said metal-infiltrated polycrystalline diamond composite tool.

* * * * *